Jan. 18, 1955

H. HURVITZ 2,700,157

DIRECTIONAL SYSTEM

Filed July 18, 1946

INVENTOR.
HYMAN HURVITZ
BY Hyman Hurvitz

Jan. 18, 1955

H. HURVITZ 2,700,157

DIRECTIONAL SYSTEM

Filed July 18, 1946

INVENTOR.
HYMAN HURVITZ
BY *Hyman Hurvitz*

United States Patent Office 2,700,157
Patented Jan. 18, 1955

2,700,157

DIRECTIONAL SYSTEM

Hyman Hurvitz, Washington, D. C., assignor, by direct and mesne assignments, to Marcel Wallace, doing business as Panoramic Laboratories, East Port Chester, Conn.

Application July 18, 1946, Serial No. 684,623

24 Claims. (Cl. 343—112)

This invention relates generally to panoramic systems of signal reception, and more particularly relates to such systems for providing directional indications simultaneously with indications of the frequency of incoming signals.

It is now well known in the prior art to provide frequency scanning systems for signal reception, which provide means for continuously monitoring a predetermined band of frequencies, and which display the relative amplitudes and the frequencies of any signals occurring in the band as deflections of visible indications on the face of a cathode-ray indicator.

It is also well known in the prior art to provide direction responsive systems of signal reception, wherein a trace is provided on the face of a cathode-ray indicator of the direction from which one or more signals originate, such systems, however, being operative at a single frequency only, or if of relatively broad band, being inoperative to determine or discriminate between the frequencies of the incoming signals.

It would be extremely useful for such applications as radio and radar countermeasures, as well as for general application to the art of radio direction finding, to be enabled to combine in a single instrument and as a unitary indication, on the face of a single cathode-ray indicator, both the direction and the frequency of a received signal which occurs at any position in a predetermined radio or radar spectrum. Such a device would enable simultaneous observation over an extremely wide band of frequencies, of all transmissions occurring within the band, and, further, would provide indications of the azimuthal direction of each transmitter from which signals originate and of the precise frequency of the transmissions.

By providing a very sharply directive receiving antenna, having extremely high gain, the overall sensitivity and consequently the range of the receiving system may be materially increased, which is of particular value in the application of the present device to radio and radar countermeasures.

In order to accomplish the above results I utilize a directional antenna of known type and which possesses a radiation pattern having suitable sharpness at any position of a predetermined relatively wide spectrum. The antenna may be rotated continuously or sector scanned by means of a suitable drive at an angular speed above the rate required to cause discrete images to combine into a single image, if a low persistence screen is utilized in the cathode-ray indicator on the face of which visual signal indications are to be presented. Should a high persistence screen be utilized the rate of rotation may be materially reduced.

The signals derived from the antenna may be amplified in a wide band translator, which may comprise an R. F. amplifier, or a preselector circuit, a mixer and an I. F. amplifier, or any other known device capable of amplifying a wide band of signals, with or without an accompanying frequency conversion. The amplified signals may be then applied to a wide band discriminator which produces an output signal having an amplitude which is proportional to the frequency of the signal impressed thereon. Such devices are well known in the art of frequency modulation, and the principles governing the design and operation of such devices are well understood.

The antenna drive is caused to operate a generator for producing sweep voltage for the cathode-ray indicator proportional to or coordinated with the motion of the antenna in such manner that the cathode-ray beam of the indicator may suffer a deflection which is representative at all times of the instantaneous azimuthal relation of the antenna.

The output of the wide band discriminator is utilized to provide a further deflection of the cathode-ray beam, and if direction be considered as being represented on one coordinate of a coordinate system, discriminator output, which represents frequency of signal, is represented on a second such coordinate.

More specifically I may produce a circular trace in correspondence with angular movement of the antenna, frequency deviations being then represented in terms of radial deflections. Or, I may provide a horizontal linear deflection to present azimuth, frequency deviations being then represented by vertical deflections.

In order to provide a suitable presentation on the face of the indicator, I utilize a cathode-ray indicator having an intensity control, which is normally adjusted approximately to or beyond signal cut-off, and I provide an amplitude detector for received signals which impresses intensifying signals on the intensity control, upon reception of a signal.

It is, accordingly, an object of the present invention to provide a panoramic direction determining device.

It is a further object of the invention to provide a system of signal reception and indication capable of providing simultaneous indications of the direction and frequency of a plurality of signals.

It is still a further object of the present invention to provide devices for presenting panoramic directional indications on the face of a cathode-ray indicator, each received signal providing an indication of its direction by the relation of a visual indication to one coordinate of a coordinate system and its frequency position in a predetermined frequency spectrum by the relation of the visual indication to a further coordinate of a coordinate system.

The above and still further objects and advantages of the invention will become apparent upon study of the following detailed description of various embodiments thereof, when taken in conjunction with the accompanying drawings, wherein.

Figure 1:
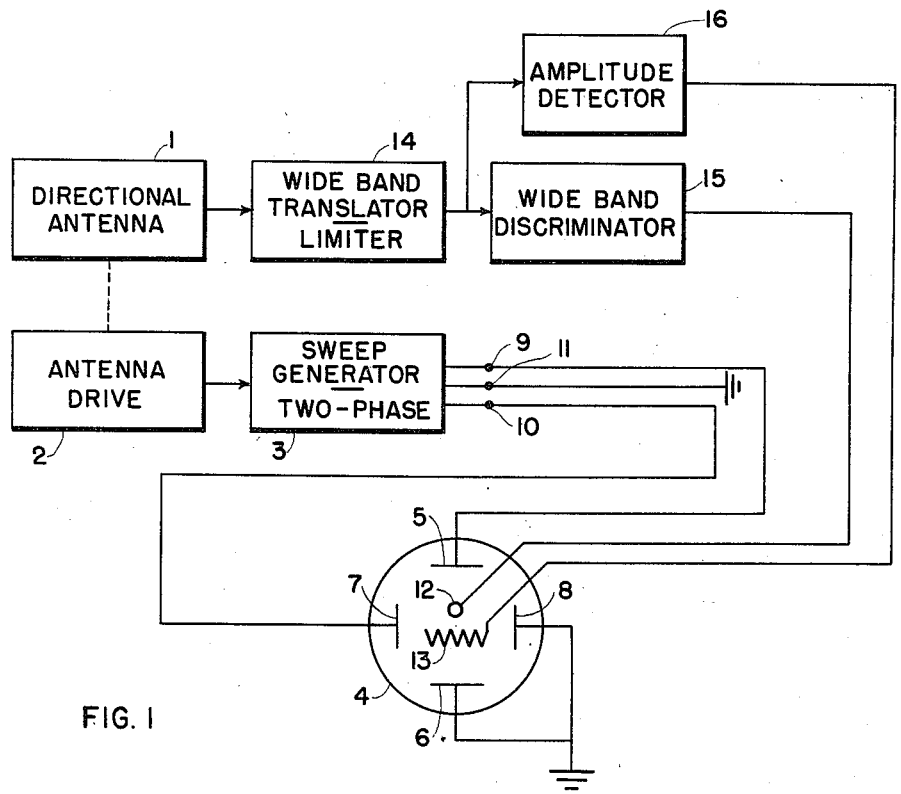
Figure 1 is a block diagram of an embodiment of the invention, providing circumferential directional indications, and radial indications of the frequencies of received signals.

Referring now to the drawings in detail, and particularly to Figure 1 thereof, the numeral 1 identifies a directional antenna, and which may be of character suitable for operation over a desired frequency spectrum. The numeral 2 represents a motor drive for the antenna 1, which causes same to rotate continuously, or which, if desired, may be arranged to cause the antenna to sweep repetitively over any predetermined sector of arc. Antenna drives of the above character are well known in the art, having found their greatest practical utility in application to radar antennas.

The sweep generator 3 is a two phase device suitable for generating a pair of frequencies of sine wave character, the frequencies being relatively diplaced in phase by 90°, and which thereby are adapted for producing a circular sweep of the beam of a cathode-ray indicator 4, having vertical plates 5 and 6 and horizontal plates 7 and 8. Plates 6 and 8 may be grounded, plates 5 and 7 being connected respectively to the output terminals 9 and 10 of the generator 3, the terminal 11 being grounded. Since the voltage with respect to ground which is derivable from terminal 9 is out of phase 90° with respect to that derivable from terminal 10, a circular trace is provided on the face of the oscilloscope 4. The output of the generator 3 may be correlated with the movements of the antenna 1, so that the azimuthal heading of antenna 1 may be read off by comparison of the position of the beam as indicated by a visible indication produced thereby.

The oscilloscope 4 is provided with an element 12 for producing radial deflection of the beam in dependence upon control voltages applied thereto, and an intensity control grid 13 for controlling the intensity of the beam. I arrange the potentials on element 12 and grid 13 to have such value in the total absence of received signals, that a barely visible circular trace is provided on the face of the indicator, having a radius about half the maximum possible radius.

Signals received on the antenna 1 are amplified in the translation device 14 to a value determined by a limiter included in the said translation device, in accordance with the usual practice in connection with frequency modulation receivers. The translation device 14 may be tunable and must have a sufficiently wide acceptance band to accommodate signals throughout a desired frequency spectrum including a large number of communication or radar channels.

In the practice of the present invention the translation device will normally comprise a conversion stage and one or more fixed frequency I. F. amplifiers, in accordance with the techniques utilized in F. M. superheterodyne receivers. The output of the translator 14 may be then applied to a wide band frequency discriminator 15, capable of detecting all signals supplied by the translator 14, and of providing an output signal having a polarity and an amplitude in response to any received signal which is determined by the sense and extent of deviation of the frequency of the detected signal from the center frequency to which the discriminator 15 may be tuned.

The output of the discriminator 15 is applied to the radial deflection control electrode 12 and causes deviation of the electron beam of the indicator 4 from its median or normal position, inwardly toward the geometrical center of the periphery of the face of the indicator 4 or outwardly toward its periphery, in accordance with the frequency of the received signal.

Due to the rotation of the antenna 1 continuous wave as well as pulsed signals assume a transient or temporary character in the translator 14 and the discriminator 15, being maintained only while the antenna is directed toward the signal originating transmitter. Accordingly, each received signal will produce an indication consisting of the arc of a circle, and which extends over an angle corresponding with the width of the receiver antenna pattern and the radial position of which corresponds with the relative position of the received signal in the frequency spectrum translated by the translator 14 and discriminator 15.

It will be clear that C. W. signals of different frequency and which originate on the same azimuth with respect to receiving antenna 1 will be received simultaneously and will accordingly produce erroneous indications. While this is a defect of the present instrument it is of minor effect practically.

It has been previously stated that the intensity control grid 13 is normally biased at or near cut-off, to provide absence of indication or but a barely visible indication in the absence of signals. Intensifier signal is provided the grid 13 by means of an amplitude detector 16 connected to the output of translator 14 and which develops an intensifying voltage upon reception of signals, and for the duration of said signals in the system.

Figure 2:
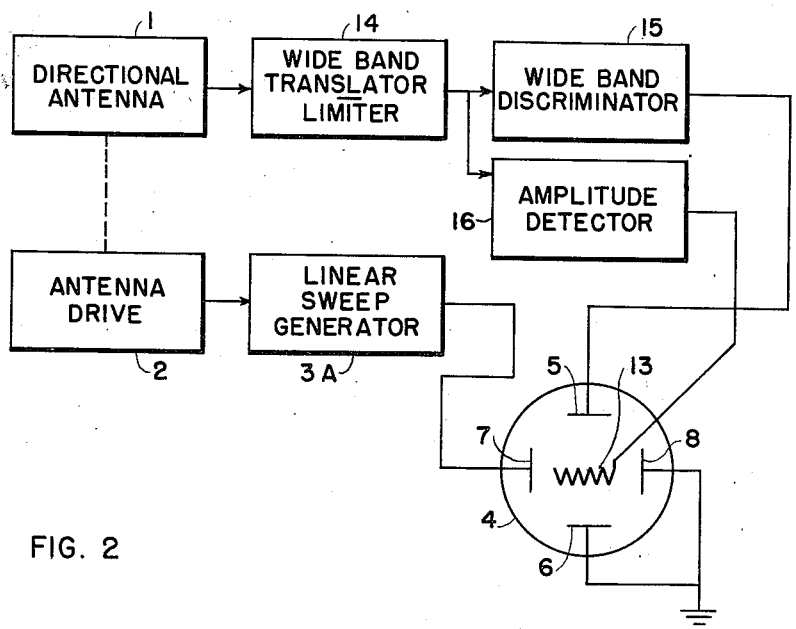
Figure 2 is a block diagram of a modification of the embodiment of Figure 1, and providing horizontal directional indications, and vertical indications of frequencies.

Referring now to Figure 2 of the drawings, there is illustrated a system of panoramic direction finding similar to that illustrated in Figure 1, in general, but providing a different type of display, direction being indicated on a horizontal coordinate on the face of the indicator, and frequency on a vertical coordinate.

In the embodiment of Figure 1 of the drawings, the rotatable or azimuth scanning antenna 1 having wide band reception characteristics and designed for the proper frequency band is rotated by a drive motor 2, provided with sector sweep control, if desired. It will, of course, be obvious that manual actuation may be substituted for motor drive.

In the system of Figure 2, signals derived from antenna 1 are converted to a fixed I. F. frequency, in one or more steps of conversion, in a wide band translating circuit 14, which further comprises amplitude limiting means. The output of translator 14, at a suitable fixed or maximum amplitude is applied to the discriminator 15 which generates an output voltage proportional to the input frequency. The output signal from discriminator 15 is applied to vertical plate 5 of cathode-ray indicator 4. At the same time the signal output from translator 14 is amplitude detected in detector 16, to provide a D. C. intensifier signal for application to the intensifier grid 13 of indicator 4, during signal reception.

The antenna drive means 2 controls a single phase generator 3a, which produces a signal having an amplitude representative of the azimuthal orientation of antenna 1. For example, zero signal may be produced for orientation in a northerly direction, and the signal may increase positively as the antenna is rotated to a southerly orientation via the east, and may increase negatively if via the west. Alternatively the output of generator 3a may be arranged to increase continuously from a predetermined value at north and for the entire possible 360° of rotation. The specific manner of frequency representative sweep voltage produced is not, however, considered to be inventive per se, and many different displays may be provided. The output signal provided by discriminator 15 is applied to vertical plate 5 of indicator 4, the opposing horizontal plate 8 being grounded.

Figure 3:
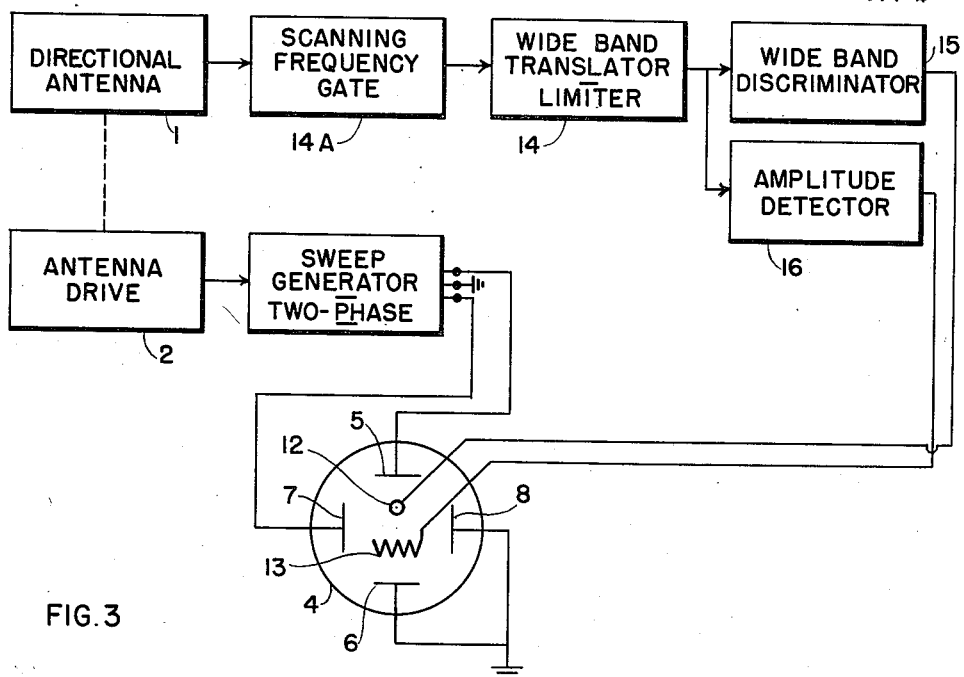
Figure 3 is a block diagram of a further modification of Figure 1.

The system disclosed in Figure 3 is precisely identical with that in Figure 1, with the exception that in Figure 3 I utilize a scanning frequency gate 14a intermediate the antenna 1 and the translator 14. It will be obvious, however, that the frequency gate 14a may be utilized at I. F. frequency, being included in translator 14, if desired, instead of in the position illustrated. A suitable device of this type has been described in detail in an application for U. S. patent, filed in the name of Marcel Wallace, on May 20, 1946, entitled Receiver Indicators, and which has been assigned Serial No. 670,892.

It has been previously indicated, in respect to the embodiment of the invention illustrated in Figure 1 of the accompanying drawings, and it is likewise true of the embodiment illustrated in Figure 2, that reception of a plurality of signals of different frequency on the same azimuth will result in an erroneous frequency indication on the face of the indicator, since the signals are simultaneously received and their detected outputs add in the discriminator 15. This defection may be overcome by the use of a scanning frequency gate 14a, which enables the entire predetermined band of frequencies which is subject to analysis in the discriminator 15 to be submitted to the said discriminator 15 in small sequentially applied segments or portions, the gate 14a passing at any instant but a small fraction of the frequency spectrum translatable by the translator 14, and in effect acting as a narrow band tunable filter, tuning recurrently from one end to another of any desired spectrum. The rate of scanning of the frequency gate 14a should be about 300 or more times as great as the rotational rate of the antenna 1, so that a complete scanning of the spectrum being analyzed may be accomplished for, roughly, each degree of rotation of the antenna.

While I have described several specific embodiments of the invention, it is to be understood that variations and modifications of these may be resorted to without departing from the spirit and scope of the invention, which is defined in the appended claims.

What I claim and desire to secure by Letters Patent of the United States is:

1. A directional panoramic receiver-indicator system comprising a cathode-ray indicator, a wide band receiving antenna having a directional reception pattern, a wide band translating means for signals received by said antenna, a wide band discriminator for frequency detecting signals derived from said translating means, means for deflecting a ray of said cathode-ray indicator in one coordinate of a coordinate system in response to pattern orientation, and means for deflecting said ray of said cathode-ray indicator in another coordinate of said coordinate system in response to frequency of signals detected by said discriminator.

2. A system in accordance with claim 1 wherein said deflections are produced simultaneously in response to orientation and frequency.

3. A system in accordance with claim 1 and further comprising intensifying means for said ray responsive to received signals.

4. A system in accordance with claim 1 wherein said coordinate system is a polar coordinate system.

5. A system in accordance with claim 1 wherein said coordinate system is a rectangular coordinate system.

6. A system in accordance with claim 1 and further comprising a relatively narrow band frequency scanning gate associated with said translating means.

7. A signal receiving and indicating system comprising a cathode-ray indicator, means for deflecting the ray of said indicator in one coordinate of a coordinate system in accordance with the magnitude of a physical quantity having directional significance, and means comprising a frequency discriminator for deflecting the ray of said indicator in another coordinate of a coordinate system in accordance with a further physical quantity representative of frequency of received signals.

8. A signal receiving and indicating system comprising a source of azimuth scanning directional reception pattern providing a relatively narrow receiving sector over a relatively wide frequency spectrum, means for causing said pattern to scan in azimuth, and means comprising a frequency discriminator for providing a simultaneous indication of the frequency and the azimuth of a received signal.

9. A system in accordance with claim 8 wherein said means for providing indications is a cathode-ray indicator.

10. In combination a directional antenna, a panoramic receiving system coupled to said antenna, and means comprising a frequency discriminator for providing direction identifiable panoramic indications of signal frequencies in response to signals received by said antenna.

11. A directional panoramic system comprising an antenna having a directional reception pattern, means for rotating said directional radiation pattern, a cathode ray tube indicator having a cathode ray beam and beam deflecting electrodes, means responsive to said means for rotating for generating beam deflecting potentials, means for applying said potentials to said beam deflection electrodes to accomplish synchronous motion of said beam and of said pattern, signal translating means coupled with said antenna for translating signals intercepted by said antenna, means for amplitude limiting the amplitudes of signals translated by said signal translating means, a frequency discriminator coupled with the output of said means for amplitude limiting to translate the frequencies of signals passed by said limiter into amplitudes of further signals, and means responsive to said further signals for modulating said cathode ray beam.

12. A directional panoramic system comprising an antenna having a directional reception pattern, means for rotating said pattern, a cathode ray tube indicator having a cathode ray beam and beam deflecting electrodes, means synchronized with rotation of said pattern for rotating said beam in synchronism with the rotation of said pattern, signal translating means coupled with said antenna for translating signals intercepted by said antenna, said signal translating means comprising a signal amplitude limiter, a frequency discriminator coupled with the output of said translating means for converting frequencies of signals into amplitudes of corresponding signals, means responsive to the output of said dicriminator for radially deflecting said beam in response to each received signal in accordance with the original frequency of said signal, and means responsive to each received signal for intensifying said beam.

13. In combination a directional antenna, means for translating signals intercepted by said antenna, said means for translating comprising a signal limiter, a frequency discriminator coupled with said translating means for converting the frequency of each signal translated by said translating means into a further signal having an amplitude corresponding with the frequency of the original signal, means for rotating said antenna, a cathode ray tube indicator having a normally de-intensified cathode ray beam and electrodes for deflecting said beam in a pair of coordinate systems, means responsive to rotation of said antenna for synchronously actuating said beam in one of said coordinate systems, means responsive to the amplitude of signals provided by said discriminator for deflecting said beam in the other of said coordinate systems, and means responsive to reception of signals by said antenna for intensifying said beam.

14. A directional panoramic system comprising a directional antenna for interception of signals having frequencies within a predetermined spectrum, means for scanning repetitively the frequencies contained in said spectrum and for passing said frequenciees in sequence, a wide band frequency discriminator, means for applying said amplitude limited signals to said frequency discriminator to generate in the output of said discriminator signals having amplitudes corresponding with the frequencies of the signals applied to said discriminator, means for rotating said antenna, a cathode ray tube having a cathode ray beam, means responsive to rotation of said antenna for actuating said cathode ray beam in one coordinate direction, means responsive to the output of said discriminator for actuating said cathode ray beam in a second coordinate direction, and means responsive to reception of a signal in said directional antenna for intensifying said beam.

15. In a directional panoramic system for receiving signals over a frequency spectrum and for indicating the bearings and frequencies of said signals, in combination, an antenna having a directional reception pattern, means for rotating said pattern, a cathode ray tube indicator having a cathode ray beam, means responsive to rotation of said pattern for actuating said beam in a first coordinate direction for establishing a correspondence between angular positions of said beam and bearings of said pattern, a scanning frequency gate coupled with said antenna for translating in sequence successive increments of frequency, means for amplitude limiting the output of said scanning frequency gate, means for converting the frequency of each signal passed by said scanning frequency gate into a further signal having an amplitude corresponding with the frequency of the signal, means for applying said further signals to deflect said beam in a second coordinate, and means responsive to passing of signals by said scanning frequency gate for intensifying said beam.

16. In a panoramic directional system an antenna having a directional reception pattern, means for rotating said pattern, a cathode ray tube indicator having a cathode ray beam, means for rotating said beam and means for radially deflecting said beam, means responsive to rotation of said pattern for rotating said beam in synchronism with said rotation, means responsive to reception of a signal by said antenna for converting the frequency of said signal into a further signal having an amplitude corresponding with said frequency, means for applying said further signal for radially deflecting said beam, and means responsive to each received signal for intensifying said beam.

17. In a directional panoramic system a directional antenna, means for rotating said antenna, a cathode ray tube indicator having a cathode ray beam, means for deflecting said beam angularly and radially, means responsive to rotation of said antenna for applying to said means for deflecting said beam voltages for varying the angular position of said beam in correspondence with the bearing of said antenna, a wide band frequency discriminator coupled with said antenna for converting the frequency of each signal received by said antenna into a further signal having an amplitude corresponding with said frequency, means for applying said further signals to said beam deflecting means to effect radial deflection of said beam, and means responsive to each received signal for intensifying said beam.

18. In a panoramic directional signal receiving system for indicating visually the simultaneous frequencies and bearings of each of a plurality of signals, a rotating antenna, a visual indicating device for providing a plot in two coordinates of frequency versus bearing, said visual indicating device having a marking element, means responsive to rotation of said antenna for actuating said marking element in synchronism with said rotation in said bearing coordinate, means responsive to each signal received by said antenna during its rotation for converting the frequency of said each signal into a further signal having an amplitude corresponding with the frequency of said each signal, means responsive to said further signal for actuating said marking element in said frequency coordinate to an extent proportional to the amplitude of said further signal, and means responsive to reception of signals by said antenna for actuating said marking element to provide a visual indication.

19. In a panoramic directional signal receiving system for indicating visually the simultaneous frequencies and bearings of each of a plurality of signals, a rotating antenna, a visual indicating device for providing a plot in two coordinates of frequency versus bearing, said visual indicating device having a marking element, means responsive to rotation of said antenna for actuating said marking element in said bearing coordinate in synchronism with said rotation, means responsive to the frequency of each signal intercepted by said rotating antenna for generating a further signal having an amplitude proportional to the frequency of said each signal, means responsive to said further signals for actuating said marking element in said frequency coordinate to extents proportional to the amplitudes of said further signals, and means responsive to reception of signals by said antenna for actuating said marking element to provide a visual indication.

20. In a system for indicating simultaneous frequency and bearing of a received signal, means for converting bearing of said signal into a further signal representative of said bearing, means for converting said signal into another signal having an amplitude proportional to the frequency of said signal, and means for converting said further signal and said another signal into a single visual presentation signifying bearing and frequency of said signal.

21. In a system for indicating simultaneous frequency and bearing of a received signal, means for converting bearing of said signal into a visual indication representative of said bearing, means for converting said signal into another signal having an amplitude proportional to the frequency of said signal, and means responsive to said another signal for converting said visual indication representative of bearing into a visual indication representative of both bearing and frequency.

22. In a system for indicating simultaneous frequency and bearing of a received signal, means for converting bearing of said signal into a visual indication representative of said bearing, means comprising a frequency discriminator for converting said signal into another signal having an amplitude proportional to the frequency of said signal, and means for displacing said visual indication representative of said bearing to indicate frequency of said signal.

23. In combination, a receiving antenna having a directional reception pattern, a panoramic receiving system coupled to said antenna, and means comprising a frequency discriminator for providing direction identifiable panoramic indications of signal frequencies in response to signals received by said antenna.

24. A panoramic receiver comprising a cathode ray indicator, a wide band receiving antenna having a directional receiving pattern, means for rotating said pattern, means comprising a wide-band frequency discriminator detector and amplitude limiter for limiting the amplitude and detecting the frequency of continuous wave signals received by said antenna, and means for visually indicating on said cathode ray indicator the amplitudes of outputs from said detector as a measure of frequency of said continuous wave received signals, as said continuous wave signals are separately brought to predominating strength by rotation of said pattern.

References Cited in the file of this patent

UNITED STATES PATENTS

| | | |
|---|---|---|
| 2,214,342 | Neufeld | Sept. 10, 1940 |
| 2,279,246 | Podliasky et al. | Apr. 7, 1942 |
| 2,279,151 | Wallace | Apr. 7, 1942 |